United States Patent [19]

Keyser

[11] 3,770,304
[45] Nov. 6, 1973

[54] SUBAQUEOUS PIPE CONNECTOR
[75] Inventor: Lewis R. Keyser, Dayton, Ohio
[73] Assignee: Price Brothers Company, Dayton, Ohio
[22] Filed: May 3, 1972
[21] Appl. No.: 249,781

[52] U.S. Cl. .................................. 285/45, 285/288
[51] Int. Cl. ............................................ F16l 11/12
[58] Field of Search ................... 285/45, 230, 288; 138/109, 153, 175, 176

[56] References Cited
UNITED STATES PATENTS
1,652,418  12/1927  Sherrerd ........................... 285/288
1,802,665  4/1931  Monteux ........................ 285/288 X
2,325,469  7/1943  Boissou ............................. 285/288

Primary Examiner—Dave W. Arola
Attorney—Lawrence B. Biebel et al.

[57] ABSTRACT

Connectors for assembling prestressed, subaqueous pipe are embedded in the pipe in a manner such that the prestressing wire wrapping the pipe core can be carried to the ends of the pipe to obviate the necessity of utilizing reenforcing bands at the pipe ends.

10 Claims, 4 Drawing Figures

PATENTED NOV 6 1973 3,770,304
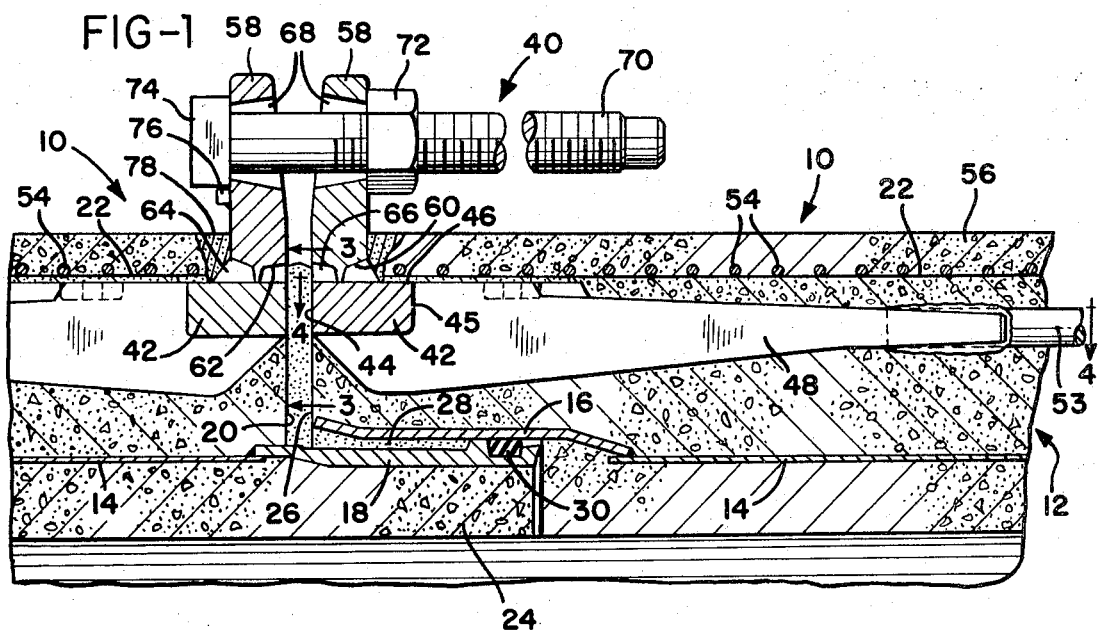
FIG-1
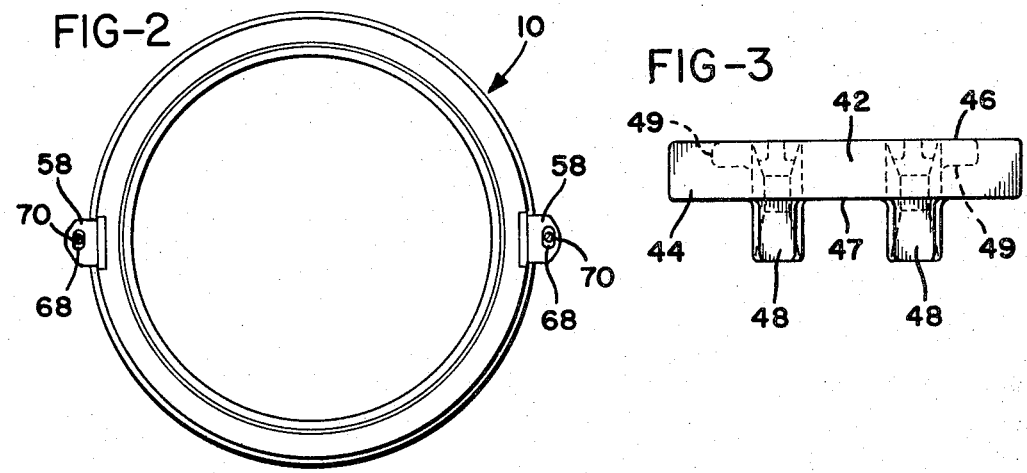
FIG-2
FIG-3
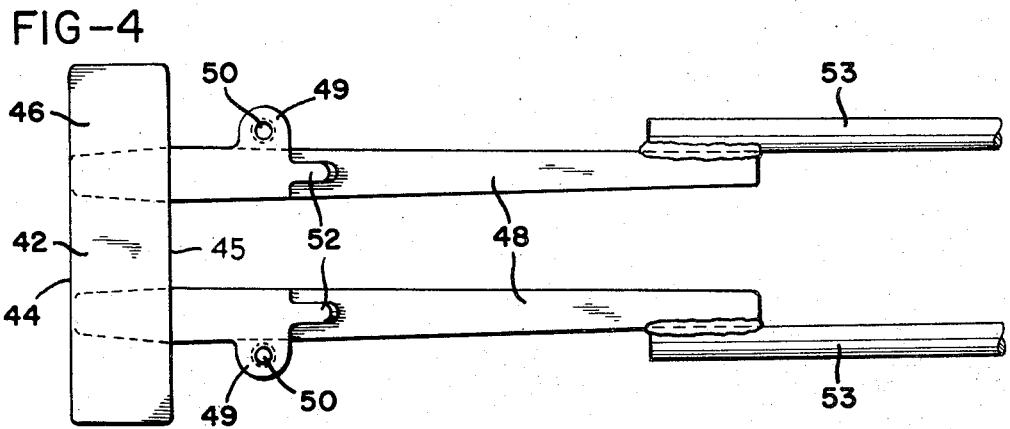
FIG-4

SUBAQUEOUS PIPE CONNECTOR

BACKGROUND OF THE INVENTION

Subaqueous pipe is usually laid under less than ideal conditions. Not only are the normal movements of divers assembling the sections hampered by diving equipment, such as bulky diving suits, but the visability under water is often impaired to the point that operations must be carried out by touch rather than visually.

Under these conditions it is almost essential that the means provided for drawing the pipe sections snugly together with the spigot of one pipe section seated firmly in the bell socket of the adjacent pipe section be uncomplicated and relatively simple to operate. One manner of accomplishing this is to provde each end of each pipe with anchor lugs having openings formed through them so that a draw bolt may be passed through the anchor lugs of two adjoining sections and a nut threaded on the draw bolt to draw the sections into engagement.

This connector is not utilized as a harness, but is merely to draw the adjoining pipe sections into engagement and thereafter, the nut is backed off a few turns to permit future movement of the joint. Regardless of this, the forces imposed on the anchor lugs as the pipes are drawn together may be substantial, on the order of say, 26,000 pounds. To resist this force anchors are embedded in the pipe spaced inwardly from the ends thereof. Each of the anchors is provided with a socket which opens to the outer surface of the pipe and is undercut to receive flanges on the anchor lugs.

For a more detailed description of subaqueous connectors, see, for example, Section 1 of "Prestressed & Reenforced Concrete Pressure Pipe Engineering Manual," 6th Edition, published by Price Brothers Company, 367 West Second Street, Dayton, Ohio.

While connectors of this type facilitate subaqueous assembly of pipe sections, the embedding of the connector anchor in the pipe interferes with the placement of prestressing wire on the pipe core. Prestressing wire is applied under high tension to place a compressive force on the pipe core and resist internal pressure subsequently imposed on the pipe during use. Therefore, where such prestressing wire is interrupted, provision must be made for resisting internal pressure loads at this point.

This has necessitated the use of relatively thick reenforcing bands at points where the reenforcing wire must be interrupted or omitted. Since the loads that must be carried by the reenforcing bands are considerable it is necessary to use relatively thick bands of steel and this obviously, increases pipe costs appreciably.

SUMMARY OF THE INVENTION

The present invention provides connectors for the subaqueous assembly of prestressed pipe which may be embedded in the pipe without causing appreciable interruption or omission of prestressing wires wrapping the pipe core, thereby eliminating the necessity of using reenforcing bands in the pipe.

The connectors in accordance with the present invention include a connector casting consisting of a relatively heavy cross bar and anchor bars which extend perpendicularly to the cross bar. The casting is embedded in the pipe core with an end face of the cross bar substantially flush with the bell or spigot shoulder of the pipe at that end and the outer face of the cross bar positioned adjacent the outer surface of the core in chord-like relationship to the pipe core outer surface.

The anchor bars, which are cast integrally with the cross bars, extend approximately parallel to the axis of the core away from the cross bar in spaced parallel relationship to each other. As will become apparent from the description below, the pull of the draw bolt used to draw the pipe sections together is applied eccentrically, inducing a large moment in the anchor bars which diminishes to practically zero at their extreme ends. The anchor bars, therefore, are formed with their cross sectional area diminishing in a direction away from the cross bar to conserve on the amount of material required. To further anchor the connectors in the pipe reenforcing bars are provided, attached to the inner ends of the anchor bars and extending back into the body of the pipe core.

A lug is attached to each of the outer faces of the cross bars adjacent the intersection of the outer and end faces of the cross bar and projects outwardly of the core. Each of the lugs has an opening formed therethrough to accommodate a draw bolt. To permit some misalignment of the openings in the lugs, they are slotted and tapered inwardly from the outer end of the pipe.

With this construction the prestressing wire may be wrapped on the pipe core up to each of the anchor lugs projecting from each end of the pipe. Thus, there is no interruption or ommision of prestressing wire at those points on the pipe where the connectors are attached. After application of the prestressing wire a protective coating of mortar or the like is applied to the pipe core, covering the prestressing wire and the base portions of the lugs.

To facilitate embedding the connector castings in the pipe core, the castings are provided with ears projecting outwardly of the anchor bars thereof having openings therethrough so that the castings may be bolted to the inside of the pipe forms. In this regard the outer surfaces of the anchor bars extend flush with the outer faces of the cross bars and are extended away from the cross bars to provide additional contact between the castings and the form and prevent the castings from tilting when they are bolted to the form.

It will be seen, therefore, that the present invention provides means facilitating subaqueous assembly of pipe sections while eliminating the necessity of relatively expensive reenforcing bands adjacent the ends of the pipe.

BRIEF DESCRIPTION OF THE DRAWINGS

FIG. 1 is a cross sectional view through a pipe line incorporating the present invention;

FIG. 2 is an end view of a pipe section incorporating the connector of the present invention;

FIG. 3 is a view taken on line 3—3 of FIG. 1; and

FIG. 4 is a view taken on line 4—4 of FIG. 1.

DESCRIPTION OF THE PREFERRED EMBODIMENTS

Referring initially to FIG. 1 of the drawings, opposite end portions of prestressed, embedded cylinder pipes 10 are shown, with each pipe section including a core 12 of concrete having a steel cylinder 14 embedded therein, a bell ring 16 welded to one end of the cylinder and a spigot ring 18 welded to the opposite end thereof.

The spigot end of the pipe includes an annular spigot shoulder 20 extending radially inwardly from the outer surface 22 of the pipe core to a spigot 24 projecting axially of the core. The bell end of the pipe section 10 includes a bell shoulder 26 projecting radially inwardly from the outer surface 22 of the core to a bell socket 28, which is complementary to the spigot 24.

With this construction it will be seen that the spigot, including the spigot ring 18, is received in the bell of the pipe section and carries a gasket 30 adjacent its outer end to make sealing contact with the inner surface of the bell ring 16.

Embedded in each end of the pipe section 10 is the subaqueous anchor 40 of the present invention. The anchor 40 includes, as best seen in FIG. 1, 3 and 4, a cross bar 42 having an end face 44, a rear face 45, an outer face 46 and inner face 47. The cross bar is embedded in the end of the pipe core with its end face 44 substantially flush with the shoulder 20 or 26 at that end of the core and its outer face is positioned adjacent the outer surface of the core and extends in chord-like relationship thereto.

Cast integrally with the cross bar 42 are a pair of anchor bars 48, which are also embedded in the pipe core and extend approximately parallel to the axis thereof and in spaced parallel relationship to each other. Since the greatest stress imposed on the anchor bars will be adjacent the intersection of the anchor bars and the cross bars, the anchor bars are formed of substantial thickness at this point and are tapered therefrom such that their cross sectional area diminishes towards their opposite ends. This reduces the amount of material required and hence, the cost of the casting.

An ear 49 projects outwardly from the outer side edges of each of the anchor bars and is provided with an opening 50 therethrough to permit the castings to be bolted to the inside of the forms in which the pipe cores are cast. In this regard it will be seen that the upper surfaces of the anchor bars adjacent the cross bars 42 are flush with the outer faces 46 of the cross bars and are provided with extensions 52 which extend back from the cross bars. This provides increased contact area between the castings and the forms to which they are bolted to prevent tilting of the castings when they are bolted to the inner surfaces of the forms.

It will also be noted from FIGS. 1 and 3 of the drawings that a reenforcing bar 53 is attached by welding to each of the anchor bars 48 and extends away from the connector casting into the body of the pipe core to further resist forces tending to pull the casting from the core.

After the pipe core is cast, embedding the connector casting therein, the form is removed and the core is wrapped with a prestressing wire 54 applied to the core under relatively high tension. This imposes a compressive stress on the pipe core that will subsequently resist internal pressures imposed on the pipe during use.

It is important that the highly tensioned prestressing wire be applied in evenly spaced wraps continuously from one end of the pipe to the other. Otherwise, where such wire wraps are interrupted or omitted, some provision, such as expensive reenforcing bands, must be provided, as in conventional subaqueous connectors of the type described above.

With the connector of the present invention, however, it will be seen that the prestressing wire 54 may be wrapped from the cross bar 42 at one end of the pipe core to the opposite end thereof, continuously and evenly, to provide uniform prestressing along substantially the entire length of the pipe core. Thereafter, a protective coating 56 of mortar is applied to the pipe core, covering the prestressing wire and all but the outer ends of the outer faces 46 of the cross bar 42.

An anchor lug 58, as best seen in FIGS. 1 and 2 of the drawings, is then attached to each of the cross bars which have been embedded in the pipe core at, preferably, diametrically opposed positions. It will be noted from FIG. 1 of the drawings that the lower edge of each of the anchor lugs 58 is provided with substantially J-shaped undercut portions 60 and 62 to permit relatively heavy J-welds, as indicated at 64 and 66, to be used to attach the anchor lugs to the cross bars. After the anchor lugs are welded to the outer faces 46 of the cross bars, additional mortar is applied, as at 78, to cover the welds 64 and a portion of the anchor lugs.

While the heavy welds provide a strong bond between the anchor lugs and the cross bars, it will be apparent that this point is still the weakest point in resisting loads applied to the anchor lugs. As a result, if excessive forces are applied to the connectors the lugs will bend or break from the cross bars rather than causing the entire connector to be torn from the pipe section. Thus, it will be necessary merely to repair or replace the anchor lugs rather than replace the entire pipe section.

Each of the lugs is provided with a slotted opening 68 therethrough, and it will be noted particularly from FIG. 1 that this opening tapers outwardly towards the end of the pipe section. By providing a slotted, tapering opening in this manner, some misalignment of the openings 68 can be tolerated and still permit the insertion of the draw bolt 70.

Thus, even though the openings 68 are not exactly centered with respect to each other, the draw bolt 70 may be inserted through the openings and the nut 72 applied and turned down on the bolt to pull the two sections together. With regard to this operation it will be noted that the head 74 of the draw bolt will usually be square and a small bar 76 may be welded to one surface of one of the anchor lugs, as seen in FIG. 1, to prevent the head from turning as the nut 72 is threaded onto the bolt.

In a typical, 84 inch, subaqueous, prestressed, embedded cylinder pipe, American Water Works Association Pipe Specification C-301, the core's thickness will be approximately 6½ inches. In adapting a pipe of this type to the connector of the present invention, a connector casting was used in which the depth of the cross bar from the outer face 46 to the inner face 47 thereof was approximately 1½ inches. The depth of the cross bar extending back into the core from the end face 44 to the rear face 45 was approximately 2½ inches while the width of the cross bar in the chord direction was approximately 9 inches.

Each of the anchor bars tapers from a maximum depth of approximately 3 inches adjacent the cross bar to a minimum depth of ⅞ inch at their opposite ends and the anchor bars taper in width from a maximum of 1 5/16 inch adjacent the rear face 45 of the cross bar to 1 inch adjacent the end face 44 of the cross bar and ⅞ inch at the opposite end of the anchor bar.

The anchor lugs are approximately 5 inches in height from their base to their outer ends and taper outwardly in thickness, as seen in FIG. 1 of the drawings, from a maximum thickness of 1⅜ inch at their bases to a minimum thickness of 1 inch at their outer ends. The slotted openings 68 are approximately 2¾ inches long and 1¾ inch high and taper in length and width outwardly towards the end of the pipe section at approximately 10°, as best seen in FIG. 1 of the drawings.

While the above dimensions have been found satisfactory for the particular type pipe described above, it will be apparent that some variation may be made to suit particular installations. Regardless of the specific dimensions of the connector, it will be apparent that the instant invention provides an improved and simplified subaqueous connector at appreciably less cost than prior art connectors of this type.

While the product herein described constitutes a preferred embodiment of the invention, it is to be understood that the invention is not limited to this precise product, and that changes may be made therein without departing from the scope of the invention.

What is claimed is:

1. A pipe comprising:
   a. a core having a bell end and a spigot end,
   b. said spigot end including an annular spigot shoulder extending radially inwardly from an outer surface of said core to a spigot projecting axially of said core,
   c. said bell end including a bell shoulder projecting radially inwardly from said outer surface of said core to a bell socket complementary to said spigot,
   d. a plurality of cross bars embedded in said core at said ends thereof,
   e. each of said cross bars having an outer face adjacent said outer surface of said core and an end face adjacent said shoulder at that end of said core,
   f. anchor bars attached to said cross bars and embedded in said core,
   g. lugs attached to said outer faces of said cross bars and projecting outwardly of said core at said shoulder thereof,
   h. means associated with said lugs for drawing the spigot of a pipe into engagement with the bell socket of another pipe,
   i. a highly tensioned prestressing wire wrapping said core substantially evenly and continuously from adjacent said lugs at one of said ends of said core to said lugs at the other of said ends of said core, and
   j. a protective coating covering said core, said prestressing wire and portions of said lugs.

2. The pipe of claim 1 wherein:
   a. said anchor bars extending approximately parallel to the axis of said core.

3. The pipe of claim 1 wherein:
   a. said end faces of said cross bars are substantially flush with said shoulders of said core.

4. The pipe of claim 1 further comprising:
   a. reenforcing bars attached to each of said anchor bars and embedded in said core.

5. The pipe of claim 1 further comprising:
   a. ears projecting outwardly from said anchor bars, and
   b. means defining openings through said ears.

6. The pipe of claim 5 wherein:
   a. outer surfaces of said ears and said anchor bars are substantially flush with said outer faces of said cross bars, and b. said flush outer surfaces of said anchor bars extend past said ears.

7. The pipe of claim 1 wherein:
   a. said anchor bars comprise a pair of anchor bars extending from each of said cross bars in spaced parallel relationship to each other.

8. The pipe of claim 1 wherein:
   a. said anchor bars are tapered and diminish in cross sectional area from said cross bars to opposite ends of said anchor bars.

9. The pipe of claim 1 wherein:
   a. said means associated with said lugs comprise slotted openings therethrough, and
   b. said openings taper in cross sectional area inwardly toward the center of said core.

10. A pipe comprising:
    a. a core of cementitious material having a bell end and a spigot end,
    b. a metallic cylinder embedded in said core,
    c. said spigot end including an annular spigot shoulder extending radially inwardly from an outer surface of said core to a spigot projecting axially of said core,
    d. said bell end including a bell shoulder projecting radially inwardly from said outer surface of said core to a bell socket complementary to said spigot,
    e. a pair of subaqueous connectors attached to each end of said core, each including:
       i. a cross bar embedded in said core outwardly of said cylinder, extending perpendicularly to the axis of said core and having an end face substantially flush with said shoulder at that end of said core and an outer face positioned in chord-like relationship to said outer surface of said core,
       ii. a pair of anchor bars attached to said cross bar and extending away from said shoulder at that end of said core inwardly into said core substantially axially thereof and in spaced parallel relationship to each other,
       iii. said anchor bars each tapering in depth from a greatest dimension at one end thereof adjacent said cross bar to a smallest dimension adjacent an opposite end thereof,
       iv. an ear projecting from each of said anchor bars and having means defining an opening therethrough,
       v. a lug attached to said outer face of said cross bar adjacent the intersection of said outer and end faces thereof and projecting outwardly of said core, and
       vi. means defining a tapered, slotted opening through said lug adapted to receive a draw bolt therethrough,
    e. an elongated reenforcing bar attached to said opposite ends of said anchor bars and extending into said core away from said anchor bars,
    f. a helical wrapping of highly tensioned prestressing wire substantially evenly and continuously wrapping said outer surface of said core from said lug at one of said ends thereof to said cross bars at the other of said ends thereof, and
    g. a protective coating of cementitious material covering said core, said prestressing wire and portions of said lugs.

* * * * *